J. T. GUTHRIE.
Railway Car Brake.
No. 85,302.
Patented Dec. 29, 1868.
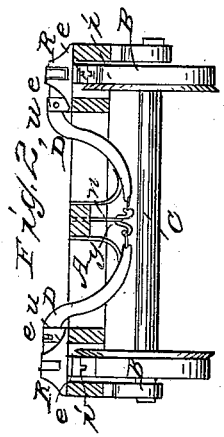
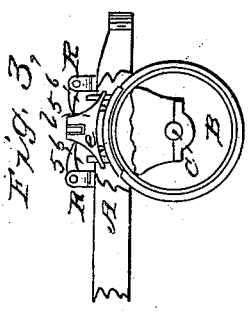
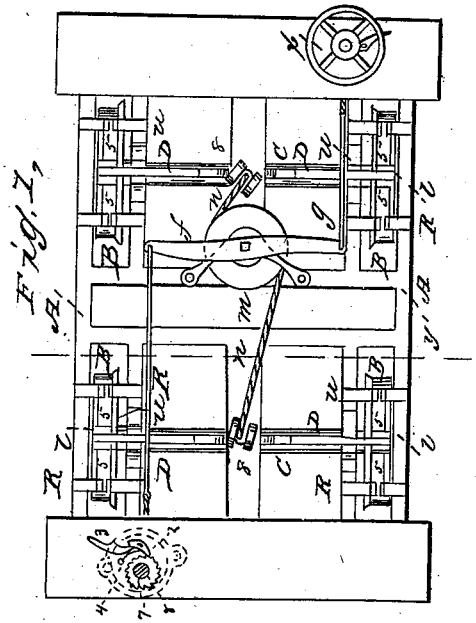
Witnesses:
James J. Johnston.
A. C. Johnston.
Inventor:
Joseph T. Guthrie

UNITED STATES PATENT OFFICE.

JOSEPH T. GUTHRIE, OF PITTSBURG, PENNSYLVANIA.

Letters Patent No. 85,302, dated December 29, 1868.

IMPROVED RAILWAY-CAR BRAKE.

The Schedule referred to in these Letters Patent and making part of the same.

*To all whom it may concern:*

Be it known that I, JOSEPH T. GUTHRIE, of Pittsburg, in the county of Allegheny, and State of Pennsylvania, have invented a new and useful Improvement in Car-Brakes; and I do hereby declare that the following is a full and exact description thereof, reference being had to the accompanying drawings, and to the letters of reference marked thereon.

The nature of my invention consists in providing the upper sides of the fulcrum-pivots of the levers, to which brakes are suspended, with springs, and placing gum springs between the brakes and rubbers, and also in providing the brakes with pivoted guides, said brakes, levers, and their operating-gear being constructed, arranged, and operating in the manner hereinafter described.

To enable others skilled in the art to make and use my invention, I will proceed to describe its construction and operation.

In the accompanying drawings, which form part of my specification—

Figure 1 is a top view or plan of my improvement in car-brakes.

Figure 2 is a transverse section of a car-truck provided with my improvement in car-brakes, when cut through at fig. 1.

Figure 3 represents a section of the car-truck, showing the position and relation of the brakes to the car-wheels, and also giving a side view of the pivoted guides for the brakes.

Figure 4 represents a side view of the guard, placed over the ratchet-wheel and pawl, connected with the hand-lever used for operating the brakes.

In the drawings—

A is the frame of the car-truck, which is of ordinary construction;

B represents the car-wheels; and

C represents the axles of the wheels.

On the upper side of the truck-frame are secured the supports $u$, or fulcra, in which are pivoted the levers D.

On the upper side of the pivots of the levers D are placed gum springs $e$.

On the outer ends of the levers D are pivoted the brakes $l$, which are provided with "shoes" or rubbers $i$, which are provided with pins 6, which are fitted in openings made in the brakes $l$, and held in position, with relation to the brakes, by means of pins or keys placed in the pins 6.

Between the brakes $l$ and rubbers $i$ are placed gum springs $e'$.

The springs $e$, placed above the pivots of the levers D, and the springs $e'$, placed between the brakes $l$ and rubber, $i$, are used for the purpose of relieving the brakes and levers to which they are attached from the jarring action caused by any unevenness in the tread of the wheels, and also for obtaining that yielding and sensitive touch which is requisite for making the brakes and their levers work smoothly, efficiently, and without that jarring, rattling, and noisy action so common in car-brakes, as ordinarily constructed.

R represents the supports for the guides 5, which are used for the purpose of holding the brakes $l$ in the desired position.

The guides 5 are pivoted in the supports R, and will yield to the up-and-down motion of the brakes $l$.

The levers D of the brakes $l$ are connected together at their inner ends, by means of links $y$, to which are attached cords or chains $n$, which pass up and over pulleys 8, and attached to the drum or pulley marked $m$, which is held in the desired position by the supports $w$.

On the upper end of the shaft or axle of the drum or pulley $m$ is attached a lever, $f$, to the ends of which are attached rods or chains $g$, which are connected with the shaft $s$ of the ordinary hand-lever $x'$, which is provided with a ratchet-wheel, 7, which is provided with what is known as a compound pawl, marked 2, 3, and 4.

The ratchet-wheel and its pawl are covered with a guard or case, $x$, for the purpose of preventing any part of a lady's dress from being caught in or by the ratchet-wheel, or its pawl.

The importance and value of the guard $x$, placed over ratchet-wheel and its pawl, consists in avoiding the many accidents that occur from ladies having their dresses caught in the ratchet-wheel and its pawl, or by passengers having their feet caught in the same way when passing from the cars.

As the construction and arrangement of my improvement in brakes, and the relation that the several parts bear to each other, will be readily understood from the foregoing description, and by reference to the accompanying drawings, I will therefore, without further description of the construction, proceed to describe their operation, which is as follows:

By turning the hand-lever $x'$, the shaft $s$ will wind up the chain attached to the rod $g$, which will draw forward the lever $f$, which will wind on the drum $m$ the chain $n$, which will raise up the inner ends of the levers D, which will force down the brakes $l$ against the upper side of the tread of the wheel B, and the gum springs $e$ and $e'$ will prevent all undue force of the brakes on the wheels, and will also prevent the jerking, jarring, rattling, and noisy action caused by the uneven surface of the tread of the wheels.

I wish it clearly understood that I do not claim broadly the use of springs combined with brakes, for such device is well known.

Having thus described the nature, construction, and operation of my improvement in brakes,

What I claim as of my invention, is—

1. The arrangement of the levers D, provided with spring bearings, and used in connection with guided shoes, hereinbefore described, and for the purpose set forth.

2. The pivoted guides 5, when used in connection with the brakes $l$, as herein described, and for the purpose set forth.

JOSEPH T. GUTHRIE.

Witnesses:
A. O. JOHNSTON,
JAMES J. JOHNSTON.